United States Patent
Hunt et al.

(10) Patent No.: US 9,630,209 B2
(45) Date of Patent: Apr. 25, 2017

(54) METHODS OF MAKING LARGE-AREA CARBON COATINGS

(71) Applicant: The Boeing Company, Chicago, IL (US)

(72) Inventors: Jeffrey H. Hunt, Thousand Oaks, CA (US); Wayne R. Howe, Irvine, CA (US); Angela W. Li, Everett, WA (US)

(73) Assignee: The Boeing Company, Chicago, IL (US)

( * ) Notice: Subject to any disclaimer, the term of this patent is extended or adjusted under 35 U.S.C. 154(b) by 844 days.

(21) Appl. No.: 13/940,513

(22) Filed: Jul. 12, 2013

(65) Prior Publication Data

US 2015/0017420 A1    Jan. 15, 2015

(51) Int. Cl.
| | |
|---|---|
| *B05D 1/06* | (2006.01) |
| *B05D 3/12* | (2006.01) |
| *H01B 1/04* | (2006.01) |
| *B82Y 30/00* | (2011.01) |

(52) U.S. Cl.
CPC ............... *B05D 3/12* (2013.01); *B05D 1/06* (2013.01); *H01B 1/04* (2013.01); *B82Y 30/00* (2013.01); *Y10T 428/25* (2015.01)

(58) Field of Classification Search
CPC ........................................................ B05D 1/06
USPC ........................................................ 427/475
See application file for complete search history.

(56) References Cited

U.S. PATENT DOCUMENTS

| | | | |
|---|---|---|---|
| 6,270,853 B1* | 8/2001 | Brown ................... | B05D 1/045 343/872 |
| 2005/0184643 A1* | 8/2005 | Cho ....................... | B82Y 10/00 313/495 |

OTHER PUBLICATIONS

U.S. Appl. No. 13/527,795, filed Jun. 20, 2012.
U.S. Appl. No. 13/740,967, filed Jan. 14, 2013.
Novoselov, Geim et al., "Electric Field Effect in Atomically Thin Carbon Films," Science, vol. 306, Oct. 22, 2004, 666-669, 4 pages.
Zyga, "How to make graphene with a pencil and sticky tape," Dec. 7, 2010, retrieved on Jul. 12, 2013 from http://www.physorg.com/news/2010-12-graphene-pencil-sticky-tape-videos.html, 7 pages.

* cited by examiner

*Primary Examiner* — Xiao Zhao
(74) *Attorney, Agent, or Firm* — Smith Moore Leatherwood LLP

(57) ABSTRACT

In one aspect, methods of coating a surface with carbon are described herein. In some implementations, a method of coating a surface with carbon comprises electrically charging carbon particles; directing the charged carbon particles toward an electrically charged surface; and contacting the charged carbon particles with the electrically charged surface. In some implementations, the method further comprises forming a coating of physisorbed carbon particles on the surface.

15 Claims, No Drawings

METHODS OF MAKING LARGE-AREA CARBON COATINGS

FIELD

This disclosure relates to large-area carbon coatings and, in particular, to carbon coatings comprising graphene or graphite.

BACKGROUND

The use of thin films or coatings of carbon has increased in recent years for various applications, including in electronics and coating technologies. However, creating inexpensive and large-area thin films of carbon has been difficult, particularly for films having thicknesses of less than 100 nm. Some previous methods of forming carbon coatings require the use of expensive and/or high-energy technologies. In addition, some previous methods require long growth and/or deposition times to provide a carbon coating having a desired thickness and/or morphology.

It has also been difficult to create thicker carbon coatings on large-area substrates in a rapid and inexpensive manner suitable for use in various coating applications.

Therefore, there exists a need for methods and apparatuses for forming large-scale carbon coatings in a rapid, cost-effective, and energy-efficient manner.

SUMMARY

In one aspect, methods of coating a surface with carbon are described herein which, in some implementations, may provide one or more advantages over previous methods. For example, in some implementations, a method described herein can be carried out in a facile, rapid, and/or inexpensive manner. Moreover, carbon coatings formed by a method described herein, in some implementations, can comprise continuous coatings of graphene, graphite, or nanoparticulate carbon having a desired thickness, including a thickness below about 100 nm or a thickness up to about 1 mm. In addition, carbon coatings formed by a method described herein, in some cases, can comprise large-area coatings, such as coatings covering more than 0.25 m$^2$, more than 1 m$^2$, or more than 10 m$^2$ of a substrate surface.

In some implementations, a method of coating a surface with carbon comprises electrically charging carbon particles; directing the charged carbon particles toward an electrically charged surface; and contacting the charged carbon particles with the electrically charged surface. In some implementations, the method further comprises forming a coating of physisorbed carbon particles on the surface. In addition, in some cases, a method described herein can also include adjusting the charge of the electrically charged surface during the coating process to maintain a substantially constant voltage between the electrically charged surface and incoming carbon particles. Further, in some implementations, a method also comprises partially or completely neutralizing the electrically charged surface, such as following completion of the coating process or once a desired amount of coating is achieved. A coating provided by a method described herein, in some implementations, can comprise graphene or graphite, including in nanoparticle form.

In another aspect, carbon-coated substrates are described herein. In some implementations, a carbon-coated substrate comprises a substrate surface and a carbon coating disposed on the substrate surface, wherein the carbon coating comprises a coating made by a method described herein. In addition, in some implementations, a carbon-coated substrate described herein comprises a carbon-coated vehicle, such as a carbon-coated automobile, aircraft, or watercraft. Further, the carbon coating of a carbon-coated vehicle, in some cases, can have an average thickness of up to about 10 μm, up to about 100 μm, up to about 1 mm, or up to about 5 mm. Carbon coatings having such thicknesses, in some implementations, can provide high electrical conductivity to the surface of the vehicle, including conductivity sufficient to transport currents or discharge charges such as electrostatic charges.

These and other implementations are described in greater detail in the detailed description which follows.

DETAILED DESCRIPTION

Implementations described herein can be understood more readily by reference to the following detailed description and examples. Elements, apparatus, and methods described herein, however, are not limited to the specific implementations presented in the detailed description and examples. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Methods of Coating a Surface with Carbon

In one aspect, methods of coating a surface with carbon are described herein. In some implementations, a method of coating a surface with carbon comprises electrically charging carbon particles; directing the charged carbon particles toward an electrically charged surface; and contacting the charged carbon particles with the electrically charged surface. The charge of the carbon particles, in some implementations, differs from the charge of the surface. For example, in some cases, the carbon particles are negatively charged and the surface is positively charged. In other instances, the carbon particles are positively charged and the surface is negatively charged.

Moreover, it is also possible, in some instances, for only the surface to be electrically charged and for the carbon particles to be electrically neutral when directed toward the charged surface. In addition, in some such cases, a method described herein can further comprise electrically polarizing the carbon particles or inducing a charge on the carbon particles.

A difference in charge between carbon particles and a surface described herein, in some implementations, can provide a voltage or electric field between the carbon particles and the surface. Further, the voltage or electric field can in some cases facilitate contact of the carbon particles with the surface, including contact with a desired force or energy. In some implementations, the difference in charge between carbon particles and a surface is selected to avoid or substantially avoid a chemical reaction of the carbon particles with the surface and/or ablation of the surface by the carbon particles. "Substantially avoiding" a chemical reaction and/or ablation of a surface, for reference purposes herein, means that no more than about 10 weight percent, no more than about 5 weight percent, or no more than about 1 weight percent of carbon particles undergo a chemical reaction and/or ablate the surface, based on the total weight of the carbon particles that contact the surface.

Additionally, in some cases, a method described herein further comprises forming a coating of physisorbed carbon particles on a surface. Physisorbed particles, for reference purposes herein, can be contrasted with chemisorbed particles. As understood by one of ordinary skill in the art, chemisorption can include adsorption of an adsorbate to a surface wherein a chemical reaction occurs between the surface and the adsorbate. A "chemical reaction," for reference purposes herein, can comprise making or breaking a chemical bond such as a covalent chemical bond. In contrast, physisorption can include adsorption of an adsorbate through van der Waals forces. In some implementations described herein, a coating of physisorbed carbon particles can be provided by contacting the charged carbon particles with a surface with a kinetic energy, electrical potential, and/or chemical potential selected to substantially avoid a chemical reaction of the carbon particles with the surface. In addition, in some implementations, the kinetic energy, electrical potential, and/or chemical potential is selected to substantially avoid ablation of the surface by the carbon particles, as described further herein.

Further, in some implementations, a coating of carbon particles is provided by a method described herein without the use of a catalyst. For example, in some cases, the electrically charged surface of a method described herein does not comprise a catalyst disposed on the surface. In some implementations, a charged surface does not comprise a catalyst for the growth of carbon nanotubes, such as a metal catalyst particle comprising cobalt, nickel, iron, or platinum or a combination thereof.

Moreover, a method described herein can also comprise adjusting the charge of the electrically charged surface during the coating process to maintain a substantially constant voltage between the electrically charged surface and incoming carbon particles. For example, in some implementations, a voltage of about 5 V to about 60 V or about 10 V to about 50 V is maintained between the surface and the carbon particles. In some cases, a constant or substantially constant voltage is maintained by partially neutralizing the electrically charged surface during formation of the carbon coating. A "substantially constant" voltage, for reference purposes herein, comprises a voltage that varies by no more than about 20 percent, no more than about 10 percent, or no more than about 5 percent during formation of the carbon coating. Alternatively, in other implementations, a pulsed or varying voltage may be used. Using a pulsed or varying voltage, in some cases, may facilitate adhesion of the carbon particles to the surface and/or the arrangement of carbon particles on the surface or within the coating in a thermodynamically favorable configuration.

More generally, methods described herein, if desired, can comprise partially or completely neutralizing an electrically charged surface during a coating process or after a coating process is complete. In some cases, for example, a surface is at least partially neutralized by contact with the charged carbon particles, without the need for any other separate neutralization step. In other cases, a surface is at least partially neutralized by the addition or removal of charge from an external charge source or drain. In some implementations, a surface is at least partially neutralized by the addition or removal of charge from the ground. In addition, in some implementations, an electrically charged surface is completely neutralized. For instance, in some cases, a surface is completely neutralized following completion of the coating process or once a desired amount of coating is achieved.

Moreover, in some implementations, a method described herein is carried out in an inert atmosphere or a partially inert atmosphere to prevent undesired chemical reactions at the surface, including due to the bombardment of the surface with charged carbon particles as described herein. An inert atmosphere, in some cases, comprises an argon atmosphere or a nitrogen atmosphere. Further, an inert atmosphere, in some implementations, comprises no more than about 1 weight percent, no more than about 0.1 weight percent, no more than about 0.01 weight percent, or no more than about 0.001 weight percent oxygen, water, or other reactive substance.

In addition, if desired, the thickness of a carbon coating provided by a method described herein can be reduced following deposition of the coating. For example, in some implementations, a method described herein further comprises applying a carbon remover to the carbon coating to remove some but not all of the carbon of the carbon coating. In some cases, the carbon remover comprises an adhesive roller, such that the method further comprises rolling an adhesive roller over the carbon coating to remove some but not all of the carbon of the carbon coating.

Turning now to steps of methods, methods of coating a surface with carbon described herein comprise electrically charging carbon particles. Carbon particles can be electrically charged in any manner not inconsistent with the objectives of the present disclosure. In some implementations, for example, carbon particles are electrostatically charged. In some implementations, carbon particles are charged by accelerating the particles through an electric field. Accelerating particles through an electric field, in some implementations, can remove electrons from the particles and thereby charge the particles. In some implementations, carbon particles are charged by expelling or spraying the particles forcefully through a nozzle, such as by means of a compressed gas.

In addition, any carbon particles not inconsistent with the objectives of the present disclosure can be used. In some implementations, for example, carbon particles comprise graphene or graphite. Graphite, in some implementations, comprises crystalline graphite such as crystalline flake graphite. Graphite can also include alpha (hexagonal) graphite or beta (rhombohedral) graphite. In some implementations, graphite comprises amorphous graphite or lump graphite. In some implementations, graphite comprises highly ordered or highly oriented pyrolytic graphite (HOPG). In some implementations, graphite comprises very high density graphite.

"Graphene" particles, for reference purposes herein, include $sp^2$-bonded carbon as a primary carbon component, as opposed to $sp^3$-bonded carbon. In some implementations, graphene particles described herein comprises no $sp^3$-hybridized carbon or substantially no $sp^3$-hybridized carbon.

For example, in some implementations, graphene particles comprise less than about 10 atom percent or less than about 5 atom percent $sp^3$-hybridized carbon, relative to the total amount of carbon. In some implementations, graphene particles comprise less than about 2 atom percent or less than about 1 atom percent $sp^3$-hybridized carbon. In some implementations, graphene particles comprise at least about 95 atom percent graphene carbon or consists essentially of graphene carbon.

In some implementations, carbon particles comprise carbon nanoparticles. Carbon nanoparticles, in some implementations, can comprise carbon nanotubes, fullerenes, nanohorns, or mixtures thereof. Fullerenes, in some cases, can comprise $C_{60}$ fullerenes or heterofullerenes or $C_{70}$ fullerenes or heterofullerenes or mixtures thereof. Carbon nanotubes, in some implementations, can comprise single-walled carbon nanotubes (SWNT) or multi-walled carbon nanotubes (MWNT) or mixtures thereof. In addition, in some cases, carbon nanotubes can have branched structures. Branched structures, in some implementations, comprise multiple branches, Y branches, Y branches with multiple branches and multi-level Y branches. In addition, carbon nanotubes, in some implementations, can be doped with boron, nitrogen or combinations thereof. In some implementations, for example, doped carbon nanotubes comprise boron in an amount ranging from about 0.01 weight percent to about 10 weight percent. In some implementations, doped carbon nanotubes comprise nitrogen in an amount ranging from about 0.01 weight percent to about weight 30 percent or from about 5 weight percent to about 25 weight percent.

Moreover, carbon nanotubes can have any size not inconsistent with the objectives of the present disclosure. For example, in some implementations, carbon nanotubes have a size in at least one dimension of less than about 300 nm or less than about 100 nm. In some implementations, carbon nanotubes have a size in at least one dimension between about 1 nm and about 200 nm, between about 1 nm and about 150 nm, or between about 5 nm and about 100 nm. In some implementations, carbon nanotubes have a size in at least one dimension between about 5 nm and about 75 nm or between about 15 nm and about 60 nm. In some implementations, carbon nanotubes have a size in at least one dimension between about 20 nm and about 30 nm or between about 45 nm and about 55 nm. In some implementations, carbon nanotubes have a size in at least two dimensions of less than about 300 nm or less than about 100 nm. In some implementations, carbon nanotubes have a size in at least two dimensions between about 1 nm and about 200 nm, between about 1 nm and about 150 nm, or between about 5 nm and about 100 nm. In some implementations, carbon nanotubes have a size in at least two dimensions between about 5 nm and about 75 nm or between about 15 nm and about 60 nm.

More generally, carbon nanoparticles described herein, in some implementations, can have a size in at least one dimension of less than about 200 nm, less than about 100 nm, or less than about 50 nm. In some implementations, carbon nanoparticles have a size in at least one dimension from about 1 nm to about 200 nm, from about 5 nm to about 150 nm, or from about 10 nm to about 100 nm. For example, in some implementations, carbon nanoparticles have a diameter less than about 200 nm. In some implementations, carbon nanoparticles have a diameter ranging from about 5 nm to about 150 nm or from about 10 nm to about 100 nm. In some implementations, carbon nanoparticles have a diameter ranging from about 20 nm to about 80 nm. In some implementations, carbon nanoparticles have a diameter ranging from about 30 nm to about 50 nm. Further, in some cases, carbon nanoparticles have a size recited above in two dimensions or all three dimensions.

In addition, in some implementations, carbon nanoparticles comprise atomic or molecular clusters of carbon. For example, in some implementations, carbon nanoparticles comprise clusters having from about 8 to about 64 carbon atoms.

Carbon particles described herein can be provided in any manner not inconsistent with the objectives of the present disclosure. In some cases, for example, carbon particles are provided as a powder or slurry, including a previously formed powder or slurry. In some cases, carbon particles are provided as a commercially available carbon powder, such as a graphite powder available from Mersen Graphite (Bay City, Mich.).

Alternatively, in other implementations, a method described herein comprises producing the carbon particles from a carbon source. For example, in some cases, carbon particles can be produced by a carbon arc-evaporation technique or by laser ablation of a carbon source. Evaporating or ablating a carbon source such as graphite can provide atomic carbon in a vapor phase that subsequently coalesces to form carbon particles. Alternatively, the atomic carbon itself can be the carbon particles of a method described herein. A carbon source such as graphite, in some implementations, can also comprise one or more metals. For example, in some implementations, a carbon source can comprise up to about 99 atom percent graphite and up to about 3 atom percent metal. The metal, in some implementations, can comprise a transition metal such as cobalt, nickel, iron, or platinum, or a combination thereof. In other implementations, a carbon source such as graphite is free or substantially free of metal. A carbon source that is "substantially free of" metal, for reference purposes herein, includes no intentionally added metal or includes less than about 0.5 atom percent metal or less than about 0.1 atom percent metal.

Prior to electrically charging carbon particles described herein, the particles, in some implementations, can be stored in a reservoir or other container. For example, the particles can be stored in a reservoir or container of an apparatus such as an electrostatic spraying apparatus that will be used to charge and/or direct the particles toward a substrate surface, as described herein.

Methods described herein also comprise directing carbon particles toward an electrically charged surface. Carbon particles can be directed toward an electrically charged surface in any manner not inconsistent with the objectives of the present disclosure. In some implementations, carbon particles are directed toward a charged surface by the electric field provided by a difference in electric charge between the carbon particles and the charged surface. In some implementations, carbon particles are directed toward a charged surface using a pressure differential between the surface and the source of the carbon particles, such as that provided by a compressed gas or a vacuum.

In some implementations, for example, carbon particles are directed toward a charged surface as an aerosol. An aerosol, in some cases, comprises a dispersion of the carbon particles in a carrier gas. A carrier gas, in some instances, is an inert gas such as helium, argon, or nitrogen. In other implementations, a carrier gas is not an inert gas. In some cases, for example, a carrier gas comprises air. An aerosol can be provided in any manner not inconsistent with the objectives of the present disclosure. In some implementations, for instance, an aerosol is provided by an aerosol spray apparatus, an atomizer nozzle, a nebulizer, an electrospray apparatus, or a vibrating orifice aerosol generator. In addition, carbon particles can be present in an aerosol in any amount not inconsistent with the objectives of the present disclosure. In some implementations, for example, an aerosol comprises from about 10 weight percent to about 90 weight percent carbon particles, based on the total weight of the aerosol. Further, in some cases, an aerosol comprises from about 10 weight percent to about 99 weight percent inert carrier gas, based on the total weight of the aerosol.

Methods described herein also comprise contacting carbon particles with a charged surface. Any surface not inconsistent with the objectives of the present disclosure may be used. In some implementations, for example, a surface comprises a metal surface, a semiconductor surface, a glass surface, or a plastic surface. In some implementations, a surface comprises a composite material surface such as a fiberglass composite surface. Moreover, in some instances, a surface is a coated surface, including a surface coated with one or more previously applied carbon coatings described herein. Further, in some implementations, a surface is substantially flat or planar. Alternatively, in other implementations, a surface is curved. In some cases, for instance, a surface is concave or convex or includes one or more concave or convex portions.

In some implementations described herein, a surface comprises a surface of a window or windshield. In some implementations, a surface comprises a surface of an electronic component or an optical component. In some implementations, a surface comprises an exterior surface of a vehicle such as an automobile, watercraft, or aircraft. Thus, in some implementations, a method described herein can be used to apply a thin carbon coating to the exterior surface of an aircraft such as an airplane or a watercraft such as a boat or submarine.

Methods described herein, in some implementations, also comprise applying a carbon remover to a carbon coating to remove some but not all of the carbon of the carbon coating. A carbon remover can be applied to a carbon coating in any manner not inconsistent with the objectives of the present disclosure. For example, in some cases, a carbon remover is rubbed, pressed, blotted, or daubed on or across a carbon coating. Moreover, a carbon remover can comprise any apparatus not inconsistent with the objectives of the present disclosure. In some cases, a carbon remover comprises one or more planar surfaces which provide friction, abrasion, and/or adhesion to a carbon coating. In some instances, a carbon remover comprises one or more curved surfaces in addition to or instead of one or more planar surfaces. For instance, in some implementations, applying a carbon remover to a carbon coating comprises rolling an adhesive roller over the carbon coating. Thus, in some instances, applying a carbon remover to a carbon coating comprises rolling an adhesive roller over the carbon coating to remove some but not all of the carbon of the carbon coating. Any adhesive roller not inconsistent with the objectives of the present disclosure can be used. In some implementations, an adhesive roller comprises an adhesive material disposed on a rolling surface of the adhesive roller. Moreover, a planar, curved, or rolling surface of an adhesive roller described herein can have any size and/or morphology not inconsistent with the objectives of the present disclosure. In some implementations, for example, the rolling surface of an adhesive roller has a cylindrical or substantially cylindrical shape. In some cases, the rolling surface has a concave or convex surface. For example, in some cases, an adhesive roller has an oblate spheroid shape. Carbon removers such as adhesive rollers having a concave or convex surface, in some implementations, can be used to remove carbon from a curved surface such as a convex or concave surface. In some implementations, the size and/or shape of the planar, curved, or rolling surface of carbon remover such as an adhesive roller is selected based on the morphology of a carbon coating and/or a coated surface.

Moreover, in some implementations, a carbon remover such as an adhesive roller described herein is coupled to a handle, holder, or other apparatus, wherein the carbon remover is configured to roll or otherwise move when the handle is moved in a direction tangential to a surface of the carbon remover, such as a rolling surface of an adhesive roller. The handle, in some implementations, is gripped and operated manually by a user. However, if desired, an adhesive roller or handle can be coupled to a moveable support structure. In some cases, such a moveable support structure can be a mechanized or robotic support structure, thus providing automated removal of a portion of a carbon coating.

In addition, the adhesive material of an adhesive roller or other carbon remover described herein can comprise any adhesive material not inconsistent with the objectives of the present disclosure. For example, an adhesive material can be a fluid material or a solid material. In some implementations, an adhesive material comprises an animal protein-based adhesive material such as a collagen glue, albumin glue, casein glue, or meat glue. In some implementations, an adhesive material comprises bone glue, fish glue, hide glue, hoof glue, or rabbit skin glue. An adhesive material can also comprise a plant-based adhesive material such as a resin or starch. In some implementations, an adhesive material comprises a Canada balsam resin, coccoina, gum arabic resin, latex, methyl cellulose, mucilage, resorcinol resin, or urea-formaldehyde resin or a combination thereof. An adhesive material can also comprise a synthetic adhesive material such as a synthetic monomer glue or a synthetic polymer glue. In some implementations, an adhesive material comprises an acrylonitrile, a cyanoacrylate, or an acrylic glue or a combination thereof. In some implementations, an adhesive material comprises an epoxy resin, an epoxy putty, an ethylene-vinyl acetate, a phenol formaldehyde resin, a polyamide, a polyester resin, a polyethylene hot-melt glue, a polypropylene glue, a polysulfide, a polyurethane, a polyvinyl acetate, a polyvinyl alcohol, a polyvinyl chloride, a polyvinylpyrrolidone, a rubber cement, a silicone, or a styrene acrylate copolymer, or a combination or mixture thereof. In some implementations, an adhesive material comprises a solvent-based adhesive. In some implementations, an adhesive material comprises a paint or a primer. In addition, in some implementations, an adhesive material described herein has an adhesion strength to carbon or a carbon coating (such as a graphene coating) that exceeds the inter-sheet bonding energy of graphene.

Carbon coatings made by a method described herein can have any thickness, morphology, or chemical property not inconsistent with the objectives of the present disclosure. In some implementations, for instance, a coating comprises graphene. In some implementations, a coating consists or consists essentially of graphene. A "graphene" coating, for reference purposes herein, includes $sp^2$-bonded carbon as a primary carbon component, as opposed to $sp^3$-bonded carbon. In some implementations, a graphene coating described herein comprises no $sp^3$-hybridized carbon or substantially no $sp^3$-hybridized carbon. For example, in some implementations, a graphene coating comprises less than about 10 atom percent or less than about 5 atom percent $sp^3$-hybridized carbon, relative to the total amount of carbon in the coating. In some implementations, a graphene coating comprises less than about 2 atom percent or less than about 1 atom percent $sp^3$-hybridized carbon. Moreover, a graphene coating described herein, in some implementations, does not comprise, consist, or consist essentially of diamond-like carbon (DLC). In some implementations, a graphene coating comprises at least about 95 atom percent graphene carbon or consists essentially of graphene carbon.

In some implementations, a graphene coating comprises, consists, or consists essentially of one or more graphene sheets. A graphene sheet, in some implementations, comprises a single molecular or atomic layer having a flat planar structure. Any number of graphene sheets not inconsistent with the objectives of the present disclosure may be used. In some implementations, a graphene coating comprises a plurality of graphene sheets. The plurality of graphene sheets, in some implementations, can be arranged in a stacked or layered configuration. In other implementations, a graphene coating comprises or consists of a single graphene sheet. Therefore, in some implementations, a graphene coating described herein comprises 1 or more atomic layers of graphene. In some implementations, a graphene coating comprises between 1 and 1000 atomic layers of graphene. In some implementations, a graphene coating comprises between 1 and 500 or between 1 and 100 atomic layers of graphene. In some implementations, a graphene coating comprises between 1 and 5 atomic layers or between 1 and 3 atomic layers of graphene. In some implementations, a graphene coating comprises 1 atomic layer of graphene. Further, in some cases, a graphene coating comprises a sufficient number of atomic layers of graphene to provide a coating thickness of up to about 10 µm, up to about 100 µm, up to about 1 mm, or up to about 5 mm.

Coatings described herein can also comprise nanoparticulate carbon. Such coatings, in some implementations, can have a granular structure. A carbon coating having a granular structure, in some implementations, comprises a plurality of grains or domains. In some implementations, the grains or domains consist of or are formed from carbon nanoparticles. In some cases, a grain or domain consists of or is formed from a single carbon nanoparticle.

In addition, in some implementations, a coating described herein is continuous or substantially continuous across a surface, as opposed to being discontinuous or unevenly disposed on the surface. For example, in some cases, a continuous or substantially continuous coating covers at least about 90 percent, at least about 95 percent, at least about 99 percent, or at least about 99.9 percent of the surface. Further, in some implementations, a coating has a uniform or substantially uniform thickness across the surface. A "substantially uniform" thickness, for reference purposes herein, comprises a thickness that varies by less than about 20 percent, less than about 10 percent, or less than about 5 percent, based on the average thickness of the coating.

A coating described herein can have any thickness not inconsistent with the objectives of the present disclosure. In some implementations, for example, a coating has an average thickness of up to about 10 µm, up to about 100 µm, up to about 1 mm, or up to about 5 mm. In other implementations, a coating has an average thickness of up to about 1000 nm. In some implementations, a coating has an average thickness of up to about 500 nm, up to about 300 nm, or up to about 200 nm. In some implementations, a coating has an average thickness of about 100 nm or less. In some implementations, a coating has an average thickness of about 50 nm or less, about 10 nm or less, or about 5 nm or less. In some implementations, a coating has an average thickness of about 3 nm or less, about 2 nm or less, or about 1 nm or less. In some implementations, a coating described herein has an average thickness greater than about 100 nm. In some implementations, a coating has an average thickness from about 1 nm to about 1000 nm, from about 1 nm to about 500 nm, from about 1 nm to about 300 nm, from about 1 nm to about 100 nm, from about 10 nm to about 300 nm, from about 10 nm to about 100 nm, from about 100 nm to about 1000 nm, or from about 500 nm to about 1000 nm. In some implementations, a coating has an average thickness from about 1000 nm to about 1000 µm. In some implementations, a coating has an average thickness from about 10 µm to about 5 mm, from about 10 µm to about 1 mm, or from about 100 µm to about 1 mm. Therefore, in some implementations, a method described herein can provide a simple and cost-effective method of making a carbon coating having a desired thinness or thickness, including over a large area.

Additionally, in some implementations, a carbon coating applied to a surface described herein covers more than about 0.25 $m^2$, more than about 1 $m^2$, more than about 10 $m^2$, or more than about 100 $m^2$ of the surface, including in a continuous or substantially continuous manner. In some implementations, a carbon coating covers between about 0.25 $m^2$ and about 1 $m^2$, between about 0.25 $m^2$ and about 10 $m^2$, between about 1 $m^2$ and about 100 $m^2$, or between about 5 $m^2$ and about 50 $m^2$ of the surface.

Further, a coating described herein, in some implementations, can exhibit one or more desired properties. In some implementations, for instance, a coating described herein exhibits a high optical transparency, including in the visible region of the electromagnetic spectrum. For reference purposes herein, optical transparency is relative to the total amount of incident radiation in a given wavelength range. Optical transparency can be measured with a broad spectral source or a narrow spectral source. Moreover, the optical transparency of a carbon coating can be measured in any manner not inconsistent with the objectives of the present disclosure, including with any suitable instrumentation. For example, in some implementations, optical transparency is measured with a spectrometer such as a BECKMAN spectrometer.

In some implementations, a coating formed by a method described herein exhibits an optical transparency of at least about 90 percent or at least about 95 percent between about 350 nm and about 750 nm. In some implementations, a coating exhibits a transparency of at least about 98 percent between about 350 nm and about 750 nm. In some implementations, a coating exhibits a transparency of at least about 99.9 percent or at least about 99.99 percent between about 350 nm and about 750 nm. In some implementations, a coating exhibits an optical transparency between about 90 percent and about 99.99 percent or between about 95 percent and about 98 percent at wavelengths between about 350 nm and about 750 nm. Moreover, in some implementations, a coating described herein exhibits an optical transparency of about 85 percent to about 99.99 percent or about 90 percent to about 95 percent at wavelengths between about 200 nm and about 800 nm or between about 220 nm and about 350 nm.

Moreover, in some implementations, a carbon coating described herein exhibits a high mechanical hardness, stiffness, or resistance to compression.

Further, coatings described herein can have any combination of properties of coatings described herein not inconsistent with the objectives of the present disclosure. In some implementations, for example, a coating can simultaneously have any thickness described herein, any chemical composition described herein, and cover any surface area described herein.

II. Carbon-Coated Substrates

In another aspect, carbon-coated substrates are described herein. In some implementations, a carbon-coated substrate comprises a substrate surface and a carbon coating disposed on the substrate surface, wherein the carbon coating comprises a coating made by a method described hereinabove in Section I. Further, in some implementations, the coating is immediately adjacent the substrate surface, and no other layers are disposed between the substrate surface and the carbon coating.

Turning now to components of carbon-coated substrates, carbon-coated substrates described herein comprise a substrate surface. Any substrate surface not inconsistent with the objectives of the present disclosure may be used. In some implementations, a substrate surface comprises a substrate surface described hereinabove in Section I. For example, in some implementations, a substrate surface is substantially flat or planar. Alternatively, in other implementations, a substrate surface is curved. In some cases, for instance, a substrate surface is concave or convex or includes one or more concave or convex portions. In some implementations described herein, a substrate surface comprises a surface of a window or windshield. In some implementations, a substrate surface comprises a surface of an electronic component or an optical component. In some implementations, a substrate surface comprises an exterior surface of a vehicle such as an automobile, watercraft, or aircraft.

Carbon-coated substrates described herein also comprise a carbon coating disposed on the substrate surface. The carbon coating can comprise any carbon coating described hereinabove in Section I. In some implementations, for example, a carbon coating comprises, consists, or consists essentially of a graphene coating. In addition, in some implementations, a carbon coating has a thickness of up to about 1 mm, up to about 100 μm, up to about 1000 nm, or up to about 100 nm. In some implementations, a carbon coating comprises one or more graphene sheets having a total of 1 to 10 atomic layers. Further, in some implementations, a carbon coating having a thickness described herein covers more than about $0.25 \text{ m}^2$, more than about $1 \text{ m}^2$, more than about $10 \text{ m}^2$, or more than about $100 \text{ m}^2$ of the substrate surface, including in a continuous or substantially continuous manner. In some implementations, a carbon coating covers between about $0.25 \text{ m}^2$ and about $1 \text{ m}^2$, between about $0.25 \text{ m}^2$ and about $10 \text{ m}^2$, between about $1 \text{ m}^2$ and about $100 \text{ m}^2$, or between about $5 \text{ m}^2$ and about $50 \text{ m}^2$ of the substrate surface.

Further, carbon coatings described herein can have any combination of properties of carbon coatings described herein not inconsistent with the objectives of the present disclosure. In some implementations, for example, a carbon coating comprises nanoparticulate carbon and is a substantially continuous coating having a thickness of up to about 100 nm and covering more than $0.25 \text{ m}^2$, more than $1 \text{ m}^2$, or more than $10 \text{ m}^2$ of the substrate surface. In some implementations, a carbon coating comprises nanoparticulate carbon and is a discontinuous coating having a varying thickness between about 1 nm and about 1 mm and covering more than $0.25 \text{ m}^2$, more than $1 \text{ m}^2$, or more than $10 \text{ m}^2$ of the substrate surface.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

That which is claimed is:

1. A method of coating a surface with carbon comprising:
   electrically charging carbon particles;
   directing the charged carbon particles toward an electrically charged surface;
   contacting the charged carbon particles with the electrically charged surface; and
   adjusting the charge of the electrically charged surface during the coating process to maintain a substantially constant voltage between the electrically charged surface and incoming carbon particles.

2. The method of claim 1, wherein the charge of the carbon particles differs from the charge of the surface.

3. The method of claim 1, further comprising forming a coating of physisorbed carbon particles on the surface.

4. The method of claim 3, wherein the coating comprises graphene or graphite.

5. The method of claim 3, wherein the coating comprises nanoparticulate carbon.

6. The method of claim 3, wherein the coating is substantially continuous across the surface.

7. The method of claim 3, wherein the coating has an average thickness of up to about 5 mm.

8. The method of claim 1, further comprising at least partially neutralizing the electrically charged surface.

9. The method of claim 1, wherein the carbon particles comprise carbon nanoparticles.

10. The method of claim 1, wherein the carbon particles comprise atomic or molecular clusters of carbon.

11. The method of claim 1, wherein the carbon particles comprise graphite or graphene.

12. The method of claim 1, wherein the charged carbon particles are directed toward the charged surface as an aerosol.

13. The method of claim 12, wherein the aerosol comprises from about 10 weight percent to about 99 weight percent inert carrier gas, based on the total weight of the aerosol.

14. The method of claim 12, wherein the aerosol comprises from about 10 weight percent to about 90 weight percent carbon particles, based on the total weight of the aerosol.

15. A method of coating a surface with carbon comprising:
   electrically charging carbon particles;
   directing the charged carbon particles toward an electrically charged surface;
   contacting the charged carbon particles with the electrically charged surface;
   forming a coating of physisorbed carbon particles on the surface; and
   rolling an adhesive roller over the coating to remove some but not all of the carbon of the coating.

* * * * *